United States Patent
Kumar et al.

(10) Patent No.: US 12,439,373 B2
(45) Date of Patent: Oct. 7, 2025

(54) METHOD AND SYSTEM TO DETERMINE SERVICE IN INCOMING MESSAGE

(71) Applicant: SAMSUNG ELECTRONICS CO., LTD., Suwon-si (KR)

(72) Inventors: Lalith Kumar, Bangalore (IN); Mahmoud Watfa, Staines (GB)

(73) Assignee: Samsung Electronics Co., Ltd., Suwon-si (KR)

( * ) Notice: Subject to any disclaimer, the term of this patent is extended or adjusted under 35 U.S.C. 154(b) by 109 days.

(21) Appl. No.: 17/660,804

(22) Filed: Apr. 26, 2022

(65) Prior Publication Data

US 2022/0346060 A1    Oct. 27, 2022

(30) Foreign Application Priority Data

Apr. 27, 2021   (IN) .............................. 202141019376
Mar. 30, 2022   (IN) .............................. 202141019376

(51) Int. Cl.
   *H04W 68/00*   (2009.01)
   *H04W 8/18*    (2009.01)
   *H04W 84/04*   (2009.01)

(52) U.S. Cl.
   CPC ......... *H04W 68/005* (2013.01); *H04W 8/183* (2013.01); *H04W 84/042* (2013.01)

(58) Field of Classification Search
   None
   See application file for complete search history.

(56) References Cited

U.S. PATENT DOCUMENTS

| | | |
|---|---|---|
| 2019/0394745 A1 | 12/2019 | Yu |
| 2020/0177565 A1 | 6/2020 | Watfa et al. |
| 2020/0305118 A1 | 9/2020 | Ryu et al. |
| 2022/0361132 A1* | 11/2022 | Gurumoorthy ..... H04W 60/005 |

FOREIGN PATENT DOCUMENTS

| | | | |
|---|---|---|---|
| WO | 2021015502 A1 | 1/2021 | |
| WO | 2021066562 A1 | 4/2021 | |
| WO | WO-2022205466 A1 * | 10/2022 | ............ H04W 48/10 |

OTHER PUBLICATIONS

Machine Translation of WO 2022/205466 (Year: 2022).*
Samsung "Only Paging for voice service" 3GPP TSG-CT WG1 Meeting #133-e, C1-216920, E-meeting, Nov. 11-19, 2021, 2 pages.

(Continued)

*Primary Examiner* — Robert M Morlan

(57) ABSTRACT

The disclosure relates to a 5G or 6G communication system for supporting a higher data transmission rate. The present subject matter refers to a method for a user equipment (UE) including a multi-universal subscriber identity module (MUSIM) in a wireless communication system is provided. The method includes registering to a public land mobile network (PLMN) on both of a 3rd generation partnership project (3GPP) access network and a non-3GPP access network, receiving, from an access and mobility management function (AMF), a message while the 3GPP access network is in an idle state, in case that the message is received over the 3GPP access network, identifying the message is related to a voice service and in case that the message is received over the non-3GPP access network, identifying that the message is related to a non-voice service.

20 Claims, 9 Drawing Sheets

(56) References Cited

OTHER PUBLICATIONS

Vivo et al., "Introduction of Paging Cause feature" SA WG2 Meeting #145E (e-meeting), S2-2105120 (revision of S2-2103985r07), May 17-28, 2021, 29 pages.
3GPP TR 21.905 V17.1.0 (Dec. 2021) Technical Report; 3rd Generation Partnership Project; Technical Specification Group Services and System Aspects; Vocabulary for 3GPP Specifications (Release 17); 65 pages.
3GPP TS 23.501 V17.4.0 (Mar. 2022) Technical Specification; 3rd Generation Partnership Project; Technical Specification Group Services and System Aspects; System architecture for the 5G System (5GS); Stage 2 (Release 17); 567 pages.
International Search Report and Written Opinion of the International Searching Authority dated Aug. 10, 2022, in connection with International Application No. PCT/KR2022/005966, 8 pages.
China Telecom, "Introduction of paging cause, " 3GPP TSG-RAN WG2 Meeting #113bis-e, R2-2103304, Electronic, Apr. 12-23, 2021, 7 pages.
Vivo, "Summary of AI 8.3.4: Paging with service indication," 3GPP TSG-RAN WG2 Meeting #113bis-e, R2-2104320, E-meeting, Apr. 12-20, 2021, 7 pages.
Samsung, "Introduction of Paging Cause feature," 3GPP TSG-WG SA2 Meeting #144E (e-meeting), S2-2102917, Elbonia, Apr. 12-16, 2021, 2021, 11 pages.
Supplementary European Search Report dated Dec. 17, 2024, in connection with European Patent Application No. 22796114.1, 14 pages.
Samsung et al., "Voice service indication in Notification message," S2-2104375, SA WG2 Meeting #145E, May 17-28, 2021, 2 pages.
3GPP TR 23.761 V1.3.0 (Mar. 2021) Technical Report, 3rd Generation Partnership Project; Technical Specification Group Services and System Aspects; Study on system enablers for devices having multiple Universal Subscriber Identity Modules (USIM) (Release 17), Mar. 2021, 106 pages.

\* cited by examiner

METHOD AND SYSTEM TO DETERMINE SERVICE IN INCOMING MESSAGE

CROSS-REFERENCE TO RELATED APPLICATIONS

This application is based on and claims priority under 35 U.S.C. § 119 of an Indian provisional patent application number 202141019376, filed Apr. 27, 2021, and Indian complete patent application number 202141019376, filed Mar. 30, 2022, the disclosures of which are incorporated by reference herein in their entirety.

BACKGROUND

1. Field

The present disclosure relates to a method and system to determine service in an incoming message. In particular, the present disclosure relates to a method and system for managing the incoming message to the MUSIM user equipment (UE) on a $3^{rd}$ generation partnership project (3GPP) access and a non-3GPP access.

2. Description of Related Art 5G mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement 6G mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BWP (BandWidth Part), new channel coding methods such as a LDPC (Low Density Parity Check) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as V2X (Vehicle-to-everything) for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing may be connected to communication networks, and it is accordingly expected that enhanced functions and performances of 5G mobile communication systems and integrated operations of connected devices may be necessary. To this end, new research is scheduled in connection with eXtended Reality (XR) for efficiently supporting AR (Augmented Reality), VR (Virtual Reality), MR (Mixed Reality) and the like, 5G performance improvement and complexity reduction by utilizing Artificial Intelligence (AI) and Machine Learning (ML), AI service support, metaverse service support, and drone communication.

Furthermore, such development of 5G mobile communication systems may serve as a basis for developing not only new waveforms for providing coverage in terahertz bands of 6G mobile communication technologies, multi-antenna transmission technologies such as Full Dimensional MIMO (FD-MIMO), array antennas and large-scale antennas, meta-material-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultra-high-performance communication and computing resources.

SUMMARY

Aspects of the disclosure are to address at least the above-mentioned problems and/or disadvantages and to provide at least the advantages described below. Accordingly, an aspect of the disclosure is to provide a method and apparatus for measuring and reporting a cross link interference in a next-generation mobile communication system.

Additional aspects will be set forth in part in the description which follows and, in part, will be apparent from the description, or may be learned by practice of the presented embodiments.

In accordance with an aspect of the disclosure, a method for a user equipment (UE) including a multi-universal subscriber identity module (MUSIM) in wireless communication system is provided. The method includes registering to a public land mobile network (PLMN) on both of a 3GPP access network and a non-3GPP access network, receiving, from an access and mobility management function (AMF), a message while the 3GPP access network is in an idle state, in case that the message is received over the 3GPP access network, identifying the message is related to a voice service and in case that the message is received over the non-3GPP access network, identifying that the message is related to a non-voice service.

The message related to the non-voice service may be received in case that the UE and a core network support a paging cause indication, the UE is indicated that the paging indication for the voice service is supported and the AMF identifies downlink data or signaling for the UE is related to the non-voice service, and the message related to the non-voice service may include a notification message.

The method may further include in case that the notification message is received over the non-3GPP access network, transmitting a service request message over the 3GPP access network to accept the non-voice service.

The method may further include in case that the notification message is received over the non-3GPP access network, transmitting a notification response message over the non-3GPP access indicating inability of the UE to send a service request message over 3GPP access network due to the UE implementation constraints.

The message related to the voice service may be received in case that the UE and a core network supports a paging cause indication, the UE is indicated that the paging indication for the voice service is supported and the AMF identifies downlink data or signaling for the UE is related to the voice service, and the message related to the voice service may include a paging message.

In accordance with another aspect of the disclosure, a method for an AMF in a wireless communication system is provided. The method includes identifying whether downlink data or signaling for a UE is related to a voice service or a non-voice service and transmitting a message, to the UE, wherein in case that the downlink data or the signaling is related to a voice service, transmitting the message over a 3GPP access network, and in case that the downlink data or the signaling is related to a non-voice service, transmitting the message over a non-3GPP access network, and wherein the UE is registered to a PLMN on both of the 3GPP access network and the non-3GPP access network.

The message may be transmitted over the non-3gpp access network includes a notification message, and the notification message may be transmitted in case that the UE and a core network supports a paging cause indication, the UE is indicated that the paging indication for the voice service is supported and the AMF identifies downlink data or signaling for the UE is related to the non-voice service.

The method may further include in case that the notification message is transmitted over the non 3GPP access network, receiving a service request message over the 3GPP access network to accept the non-voice service.

The method may further include in case that the notification message is transmitted over the non 3GPP access network, receiving a notification response message over the non-3GPP access indicating inability of the UE to send a service request message over 3GPP access network due to the UE implementation constraints.

The message related to the voice service may be received in case that the UE and a core network supports a paging cause indication, the UE is indicated that the paging indication for the voice service is supported and the AMF identifies downlink data or signaling for the UE is related to the voice service, and the message related to the voice service may include a paging message.

In accordance with another aspect of the disclosure, a UE including a MUSIM in a wireless communication system is provided. The UE includes a communication unit and at least one processor configured to register to a PLMN on both of a 3GPP access network and a non-3GPP access network, receive, from an AMF, a message while the 3GPP access network is in an idle state, in case that the message is received over the 3GPP access network, identify the message is related to a voice service, and in case that the message is received over the non-3GPP access network, identify that the message is related to a non-voice service.

The message related to the non-voice service may be received in case that the UE and a core network supports a paging cause indication, the UE is indicated that the paging indication for the voice service is supported and the AMF identifies downlink data or signaling for the UE is related to the non-voice service, and the message related to the non-voice service may include a notification message.

The at least one processor may be configured to in case that the notification message is received over the non-3GPP access network, transmit a service request message over the 3GPP access network to accept the non-voice service.

The at least one processor may be configured to in case that the notification message is received over the non-3GPP access network, transmit a notification response message over the non-3GPP access indicating inability of the UE to send a service request message over 3GPP access network due to the UE implementation constraints.

The message related to the voice service may be received in case that the UE and a core network supports a paging cause indication, the UE is indicated that the paging indication for the voice service is supported and the AMF identifies downlink data or signaling for the UE is related to the voice service, and the message related to the voice service may include a paging message.

In accordance with another aspect of the disclosure, an AMF in a wireless communication system is provided. The AMF includes a communication unit and at least one processor configured to identify whether downlink data or signaling for a UE is related to a voice service or a non-voice service, and transmit a message, to the UE, wherein in case that the downlink data or the signaling is related to a voice service, transmit the message over a 3GPP access network, and in case that the downlink data or the signaling is related to a non-voice service, transmit the message over a non-3GPP access network, and wherein the UE is registered to a PLMN on both of the 3GPP access network and the non-3GPP access network.

The message is transmitted over the non-3gpp access network includes a notification message, and the notification message may be transmitted in case that the UE and a core network supports a paging cause indication, the UE is indicated that the paging indication for the voice service is supported and the AMF identifies downlink data or signaling for the UE is related to the non-voice service.

The at least one processor may be configured to in case that the notification message is transmitted over the non 3GPP access network, receive a service request message over the 3GPP access network to accept the non-voice service.

The at least one processor may be configured to in case that the notification message is transmitted over the non 3GPP access network, receive a notification response message over the non-3GPP access indicating inability of the UE to send a service request message over 3GPP access network due to the UE implementation constraints.

The message related to the voice service may be received in case that the UE and a core network supports a paging cause indication, the UE is indicated that the paging indication for the voice service is supported and the AMF identifies downlink data or signaling for the UE is related to the voice service, and the message related to the voice service may include a paging message.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
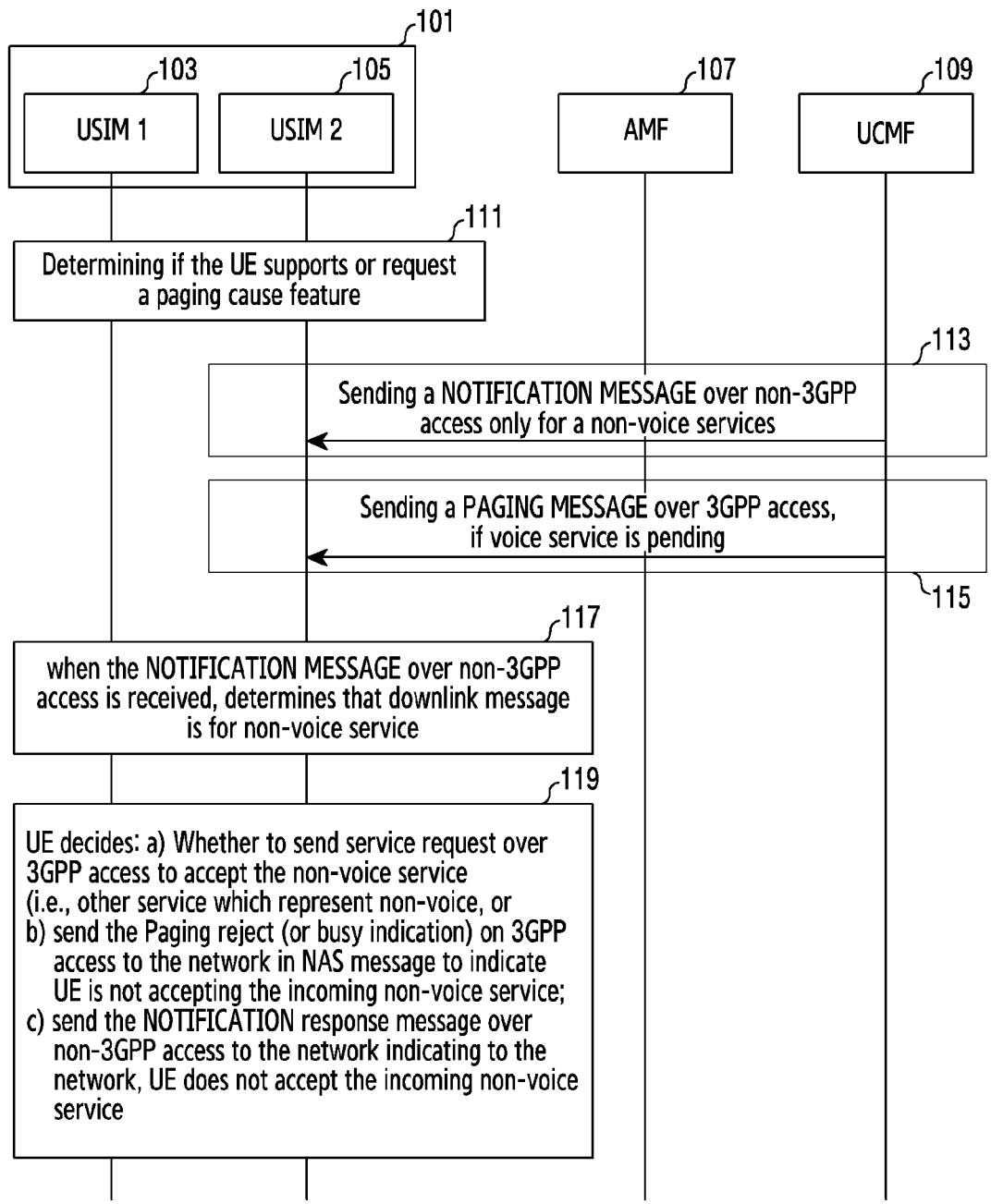
FIG. 1 illustrates a method for managing an incoming message to a MUSIM UE registered with an AMF on a 3GPP access and a non-3GPP access of same network according to an embodiment of the present disclosure.

FIGS. 1 through 9, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In describing the embodiments of the disclosure, descriptions of technical contents that are well known in the technical field to which the disclosure belongs and are not directly related to the disclosure will be omitted. This is to more clearly convey the subject matter of the disclosure without obscuration thereof by omitting unnecessary descriptions thereof.

For the same reason, some components in the accompanying drawings may be exaggerated, omitted, or schematically illustrated. Also, the size of each component may not completely reflect the actual size thereof. In the drawings, the same or corresponding elements may be given the same reference numerals.

The advantages and features of the disclosure and the accomplishing methods thereof will become apparent from the embodiments of the disclosure described below in detail with reference to the accompanying drawings. The disclosure may, however, be embodied in many different forms and should not be construed as being limited to the embodiments of the disclosure described below; rather, these embodiments of the disclosure are provided to complete the disclosure and fully convey the scope of the disclosure to those of ordinary skill in the art and the disclosure will be defined only by the scope of the claims. Throughout the specification, like reference numerals may denote like elements.

Throughout the disclosure, the expression "at least one of a, b or c" indicates only a, only b, only c, both a and b, both a and c, both b and c, all of a, b, and c, or variations thereof.

It should be understood at the outset that although illustrative implementations of the embodiments of the present disclosure are illustrated below, the present disclosure may be implemented using any number of techniques, whether currently known or in existence. The present disclosure should in no way be limited to the illustrative implementations, drawings, and techniques illustrated below, including the exemplary design and implementation illustrated and described herein, but may be modified within the scope of the appended claims along with their full scope of equivalents.

The term "some" as used herein is defined as "none, or one, or more than one, or all." Accordingly, the terms "none," "one," "more than one," "more than one, but not all" or "all" would all fall under the definition of "some." The term "some embodiments" may refer to no embodiments or to one embodiment or to several embodiments or to all embodiments. Accordingly, the term "some embodiments" is defined as meaning "no embodiment, or one embodiment, or more than one embodiment, or all embodiments."

The terminology and structure employed herein is for describing, teaching, and illuminating some embodiments and their specific features and elements and does not limit, restrict, or reduce the spirit and scope of the claims or their equivalents.

More specifically, any terms used herein such as but not limited to "includes," "comprises," "has," "consists," and grammatical variants thereof do NOT specify an exact limitation or restriction and certainly do NOT exclude the possible addition of one or more features or elements, unless otherwise stated, and furthermore must NOT be taken to exclude the possible removal of one or more of the listed features and elements, unless otherwise stated with the limiting language "MUST comprise" or "NEEDS TO include."

Whether or not a certain feature or element was limited to being used only once, either way, it may still be referred to as "one or more features" or "one or more elements" or "at least one feature" or "at least one element." Furthermore, the use of the terms "one or more" or "at least one" feature or element do NOT preclude there being none of that feature or element, unless otherwise specified by limiting language such as "there NEEDS to be one or more . . . " or "one or more element is REQUIRED."

Unless otherwise defined, all terms, and especially any technical and/or scientific terms, used herein may be taken to have the same meaning as commonly understood by one having ordinary skill in the art.

Examples of a terminal may include a UE, a mobile station (MS), a cellular phone, a smartphone, a computer, a multimedia system capable of performing a communication function, or the like.

In the disclosure, a controller may also be referred to as a processor.

It will be understood that each block of process flowchart diagrams and combinations of flowchart diagrams may be performed by computer program instructions. Because these computer program instructions may be mounted on a processor of a general-purpose computer, special-purpose computer, or other programmable data processing equipment, the instructions executed through a processor of a computer or other programmable data processing equipment may generate a means of performing the functions described in the flowchart block(s). Because these computer program instructions may be stored in a computer-usable or computer-readable memory that may be directed to a computer or other programmable data processing equipment to implement a function in a particular manner, the instructions stored in the computer-usable or computer-readable memory may also produce a production item containing an instruction means of performing the functions described in the flowchart block(s). Because the computer program instructions may also be mounted on a computer or other programmable data processing equipment, the instructions performing a series of operations on the computer or other programmable data processing equipment to generate a computer-implemented process to perform the computer or other programmable data processing equipment may also provide operations for executing the functions described in the flowchart block(s).

Also, each block may represent a portion of a module, segment, or code including one or more executable instructions for executing one or more specified logical functions. Also, it should be noted that the functions mentioned in the blocks may also occur in a different order in some alternative implementation examples. For example, two blocks illustrated in succession may actually be performed substantially at the same time or may sometimes be performed in the opposite order depending on the corresponding function.

Also, the term "unit" used herein means a software component or a hardware component such as a field-programmable gate array (FPGA) or an application-specific integrated circuit (ASIC), and the "unit" performs some functions. However, the "~unit" is not limited to software or hardware. The "~unit" may be configured to be in an addressable storage medium or may be configured to operate one or more processors. Thus, as an example, the "~unit" may include components such as software components, object-oriented software components, class components, and task components and may include processes, functions, attributes, procedures, subroutines, segments of program code, drivers, firmware, microcode, circuits, data, databases, data structures, tables, arrays, and variables. A function provided by the components and "~units" may be associated with the smaller number of components and "~units" or may be further divided into additional components and "~units." In addition, the components and "~units" may be implemented to operate one or more central processing units (CPUs) in a device or a security multimedia card. Also, in embodiments, the "~unit" may include one or more processors.

In the following description, terms for identifying access nodes, terms referring to network entities, terms referring to messages, terms referring to interfaces between network entities, terms referring to various identification information, and the like are used for convenience of description. Thus, the disclosure is not limited to the terms used below and other terms referring to objects having equivalent technical meanings may be used.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

In the following description, terms and names defined in the 3rd generation partnership project long term evolution (3GPP LTE) and new radio (NR) standards or modified terms and names based thereon may be used for convenience of description. However, the disclosure is not limited to those terms and names and is equally applicable to systems according to other standards.

That is, in particularly describing the embodiments of the disclosure, the communication standards defined in 3GPP may be mainly targeted; however, the subject matter of the disclosure may also be applied to other communication systems having similar technical backgrounds with some modifications without materially departing from the scope of the disclosure, which may be possible by the judgment of those of ordinary skill in the technical field of the disclosure.

Embodiments of the present disclosure will be described below in detail with reference to the accompanying drawings.

According to the existing systems and methods, when UE has pending data or signaling to be delivered to the UE which is in the IDLE state, network (in particular AMF) have two options to indicate that there is a pending data or signaling for the UE, one is the paging procedure over 3GPP access and second is the NOTIFICATION procedure over non-3GPP access, in response to receiving this message the UE triggers service request procedure over 3GPP access, get into connected mode and receive the incoming pending data or signaling. The dual USIM UE contains MUSIMs and subscriptions of the MUSIMs are different and independent of each other. Now, when the USIM-1 stack, hereafter called as USIM-1, of multi USIM device (e.g., UE) is registered with the same network on both the 3GPP access and non-3GPP access and it is served by the same AMF.

Thus, in that situation if the NOTIFICATION message is sent to the UE over non 3GPP access then the UE is not capable of identifying a pending downlink service/signaling pending over the 3GPP access due to which this NOTIFICATION message was sent by network to the UE, thus UE is forced to trigger a service request procedure and go to the connected mode over 3GPP access and receive the downlink data packets to understand the incoming service to the UE. This impacts the ongoing service provided by the USIM-2 stack, hereafter called as USIM-2, of the same multi USIM device for eg. if the user is busy in playing games via the USIM-2, the UE assumes that there may be a voice call via USIM-1 thus the gaming operation may be suspended in order to attend an incoming service on the USIM-1. But when the USIM-1 receives the downlink data, it realizes that it is not for a voice call thus USIM-1 aborts the service, go back to the USIM-2 to resume the gaming service. The reason being that the UE is not capable of identifying the pending downlink service/signalling message over the 3GPP access when the notification message is received over the non-3GPP access. This impacts the ongoing service on the USIM-2. Further, a network resource on the USIM-1 is also wasted because of the UE triggered service request (SR) procedure. Thus, its desirable to solve this problem.

Further, when the UE is registered to an operator for a USIM-1 and the operator sends the radio capability identity for a radio capabilities set, emergency number list or operator determined access class barring configuration to the UE for the first USIM. Now, it is not clear whether the UE can use the same radio capability ID for the same set of radio capabilities for the case when the UE is registering to same operator or different operator using USIM-2. The same scenario is not clear for the operator determined access barring configuration and emergency number.

Thus, it is desired to address the above-mentioned disadvantages or other shortcomings or at least provide a useful alternative.

FIG. 1 illustrates a method for managing an incoming message to a MUSIM UE registered with an AMF on a 3GPP access and a non-3GPP access of same network according to an embodiment of the present disclosure.

As shown in the FIG. 1, a UE 101 is a MUSIM UE having at least two USIMs. For the ease of explanation only two USIM is shown in the FIG. 1. However, the UE 101 may have more than one USIM. According to an embodiment, the USIM-1 103 and USIM-2 105 is register with a same AMF 107. The AMF 107 then communicates with a UE radio capability management function (UCMF) 109 for a communication with a network.

According to an embodiment of the present disclosure, the UE 101 and the network may support paging restriction. The UE 101, if the MME/AMF indicates that the network supports paging restriction, may indicate paging restriction information in the service request, or the extended service request or the tracking area update request (or any other non-access stratum (NAS) message). The paging restriction information may indicate any of the following:
a) all paging is restricted,
b) all paging is restricted, except paging for voice service (e.g., IMS voice, MMTel voice or circuit-switched (CS) domain voice),
c) all paging is restricted, except for certain PDN Connection(s), or
d) all paging is restricted, except for certain PDN Connection(s) and voice service (e.g., IMS voice, MMTel voice or CS domain voice).

According to an embodiment, though the UE 101 and the network both may support paging restriction feature, but AMF 101 or MME (not shown) may not be able to support the voice service identification at the core network. For e.g., due to home routed IMS PDU session the IP headers (or the user data packet or downlink data packet) is not marked with appropriate headers or tagged such that serving core network is not able to differentiate if the incoming service (i.e., the downlink data packets) is for the voice or not. Thus, there is no way in which core network is able to differentiate if the downlink data packet is for the voice service or any other services.

In such a situation if a UE 101 requests for paging restriction which is related to voice service for e.g., if the UE 101 requests to be paged only for the voice service. So, in that situation if the downlink packets arrive on the IMS PDU session, then core network may page the UE 101. The UE 101 may mistakenly understand that paging is for voice services only and may take away the RF from second UE of the multi USIM device. Thus, impacting the service on the second UE. When the UE (first UE) now responds to incoming paging request UE may realize that incoming data packets are not for the voice service, UE may be forced to abort the ongoing session and switch back to UE-2 (second UE). This may cause unnecessary interruption in the second UE operation.

To avoid this problem the UE first checks if network supports voice service identification for example by checking if the network supports the paging cause feature to indicate voice service. i.e., if network supports voice service indication feature. If network supports voice service indication feature this means that network, precisely speaking the core network is capable of identifying the data packets related to voice service indication for that UE in the IDLE state or RAN node is capable of identifying the data packets is related to voice service in RRC INACTIVE state. Hence network is also capable of performing paging restrictions for voice service. So, in summary, the UE 101 checks if the network supports paging cause feature with voice service as an indicator (also called as voice service indication) then the UE 101 makes a request for paging restrictions involving the voice service. i.e., only in case paging cause feature with voice service as an indication is supported by the network (either only by core network or only by RAN node or by both) the UE 101 may make a request for paging restrictions related to voice service otherwise the UE 101 may not make a request for paging restrictions related to voice services i.e.

For example, below mentioned paging restrictions are related to voice service:
a) all paging is restricted, except paging for voice service (MMTel voice or CS domain voice);
b) all paging is restricted, except for certain PDN Connection(s) and voice service (MMTel voice or CS domain voice);
c) all paging is restricted, except paging for voice service (IMS voice); or
d) all paging is restricted, except paging for voice service (IMS voice) and certain PDU session(s).

According to an embodiment, if a network (i.e., core network node like AMF/MME) indicates that the network does not support the paging cause feature with voice service as an indicator then the UE 101 does not request for paging restrictions related to voice service. If the UE 101 makes a paging restriction indicating voice service, then those restrictions are ignored by the network or explicitly indicated to the UE that this paging restriction is not accepted by the network to the UE 101. So that the UE 101 can precisely understand whenever paging is received whether that is inline to set paging restrictions by the UE 101.

In general, when paging restrictions are indicated by the UE 101, a network responds with a NAS message indicating to the UE 101 whether those respective individually paging restrictions are accepted or not accepted. Not accepted by the network means that network may not perform paging filtering (or paging restrictions) of the respective paging filtering information (which is subset or full paging restrictions requested by the UE 101) based on the paging restriction information provided by the UE.

According to an embodiment, when the paging restrictions indicated by the UE 101 are not accepted by the network, the network may provide a timer to the UE 101, then the UE 101 may not again request for the same set of paging restrictions until that the timer expires or may not request the paging restrictions which were not accepted by the network.

According to an embodiment, when the UE 101 (i.e., UE-1 of multi USIM device) is registered with the same network on both the 3GPP access and non-3GPP access, it is served by the same AMF. Thus, in that situation if the NOTIFICATION message is sent to the UE 101 over non 3GPP access then the UE 101 is not capable of identifying the pending downlink service/signalling message over the 3GPP access, thus the UE 101 is forced to trigger a service request procedure and go to connected mode over 3GPP access and receive the downlink data packets to understand the incoming service to the UE 101. This impacts the ongoing service on the UE-2 of the same multi USIM device.

To solve this problem, if a network and the UE 101 supports paging cause feature, or if the UE 101 is in the MUSIM mode of operation or if the UE requests for paging cause (e.g., voice service indication) or if a network and the UE 101 supports one or more of the MUSIM related features (for example like one or more of the connection releases paging cause indication for voice service, reject a paging request, a paging timing collision control, a paging restriction) then the network sends NOTIFICATION message over non-3GPP access to the UE 101 only for the non-voice services. If voice service is pending, the network sends the paging message to the UE 101 over the 3GPP access.

Thus, whenever NOTIFICATION message is received by the UE 101 over non-3GPP access the UE 101 understands that it is for the non-voice service and based on this information, the UE 101 decides:

a) Whether to send service request over 3GPP access to accept the non-voice service (i.e., other service which represent non-voice);
b) send the paging reject (or busy indication) on 3GPP access to the network in NAS message to indicate that the UE 101 is not accepting the incoming non-voice service; or
c) send the NOTIFICATION response message over non-3GPP access to the network indicating to the network, the UE 101 does not accept the incoming non-voice service.

In an aspect of the disclosure, the UE 101 and network can also negotiate over NAS signalling message exchange if:
a) a NOTIFICATION message received over non-3GPP access may indicate only non-voice service; or
b) a NOTIFICATION message received over non-3GPP access may indicate non-voice service and also any other services (i.e., for e.g., voice).

Based on the above the UE 101 identifies what kind of the incoming service is pending to the UE when the NOTIFICATION message is sent to the UE over the non-3GPP access.

Referring back to the FIG. 1, at block 111 it was first deciding that if the UE 101 supports a paging cause feature if the network and the UE 101 supports the paging cause feature, or if the UE 101 is in the MUSIM mode of operation or if the UE 101 requests for paging cause indication or if the network and the UE supports one or more of the MUSIM related features. After satisfying any of the condition mentioned in the block 111, in a condition when the UE 101 receives any downlink data or signalling message from the network, then at block 113, the network sends the NOTIFICATION message over non-3GPP access to the UE 101 only for the non-voice services. Further, if the voice service is pending or non-voice service is pending, the network sends the paging message to the UE 101 over the 3GPP access at shown in the block 115.

Accordingly, whenever the NOTIFICATION message is received by the UE 101 over non-3GPP access, the UE 101 understand that it is for the non-voice service as shown in the block 117 and based on this information, the UE 101 decides any one of a following actions as shown in the block 119:
a) whether to send a service request over 3GPP access to accept the non-voice service (i.e., other service which represent non-voice);
b) send the paging reject (or busy indication) on 3GPP access to the network in NAS message to indicate the UE 101 is not accepting the incoming non-voice service; or
c) send the NOTIFICATION response message over non-3GPP access to the network indicating to the network, a UE does not accept the incoming non-voice service, due to the UE 101 implementation constraints. i.e., the UE 101 cannot accept the incoming non-voice service because the UE 101 is busy on another SIM and the UE 101 has constraints to communicate on both the SIMS at the same time.

According to an embodiment, the UE 101 and network can also negotiate over NAS signalling message exchange if:
a) a NOTIFICATION message received over non-3GPP access may indicate only non-voice service (not show in the figure); or
b) a NOTIFICATION message received over non-3GPP access may indicate non-voice service and also any other services (i.e., for e.g., voice) (not show in the figure).

Figure 2:
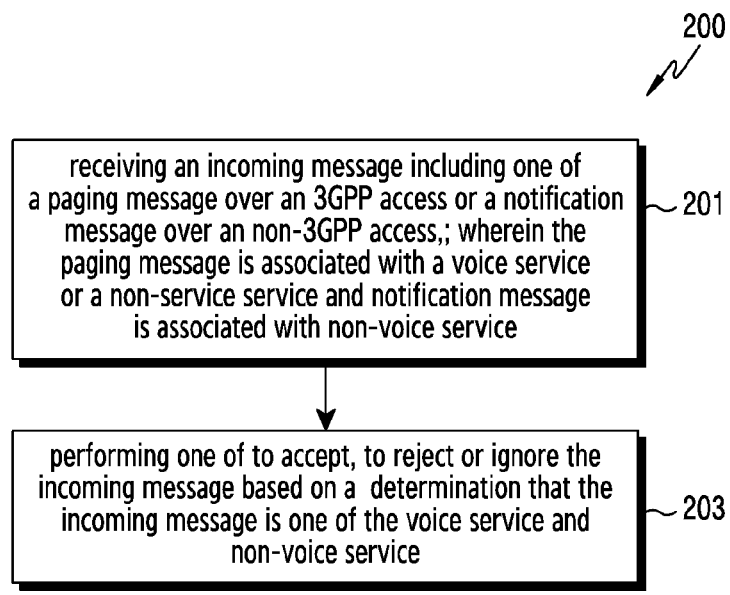
FIG. 2 illustrates a flow chart for managing an incoming message to a MUSIM UE at the UE according to an embodiment of the present disclosure.

FIG. 2 illustrates a flow chart for managing an incoming message to a MUSIM UE at the UE 101 according to an embodiment of the present disclosure.

FIG. 2 shows a method 200 implemented in the MUSIM UE 101. The FIG. 2 corresponds to method flow as disclosed in the FIG. 2.

Initially at block 201, the UE 101 receives an incoming message including one of a paging message over an 3GPP access or a notification message over a non-3GPP access. As discussed above the paging message is associated with the voice service or the non-service service and notification message is associated with non-voice service. According to an embodiment, the determination whether the incoming message is the voice service, or the non-voice service is decided based on the indication in the paging message that was supported by the UE 101 and the network.

According to an embodiment, the notification message over the non-3GPP access network is received by the UE 101 when below condition is satisfied:
the UE supports and requests for the paging cause indication feature to the network,
the network has indicated "paging indication for voice services supported" to the UE, and
the downlink data or signalling is related to the non-voice service.

At step 203, the UE 101, either accepts, rejects or ignores the incoming message based on the determination that the incoming message is one of the voice service and non-voice service. According to an embodiment the UE 101 decides to accept, reject, or ignore based on UE's implementation constrains, i.e., the UE 101 cannot accept the incoming non-voice service because the UE 101 is busy on another SIM and the UE 101 has constraints to communicate on both the SIMS at the same time.

Thus, after the step 203, the UE 101 triggers a service request message over the 3GPP access to accept the non-voice service when the incoming message is accepted. Accordingly, the if the UE 101 rejects the incoming message, then the UE 101 transmits a notification response message over a non-3GPP access to the network to indicate inability of the UE 101 to send a service request message over 3GPP access due to the UE 101 implementation constraints.

Figure 3:
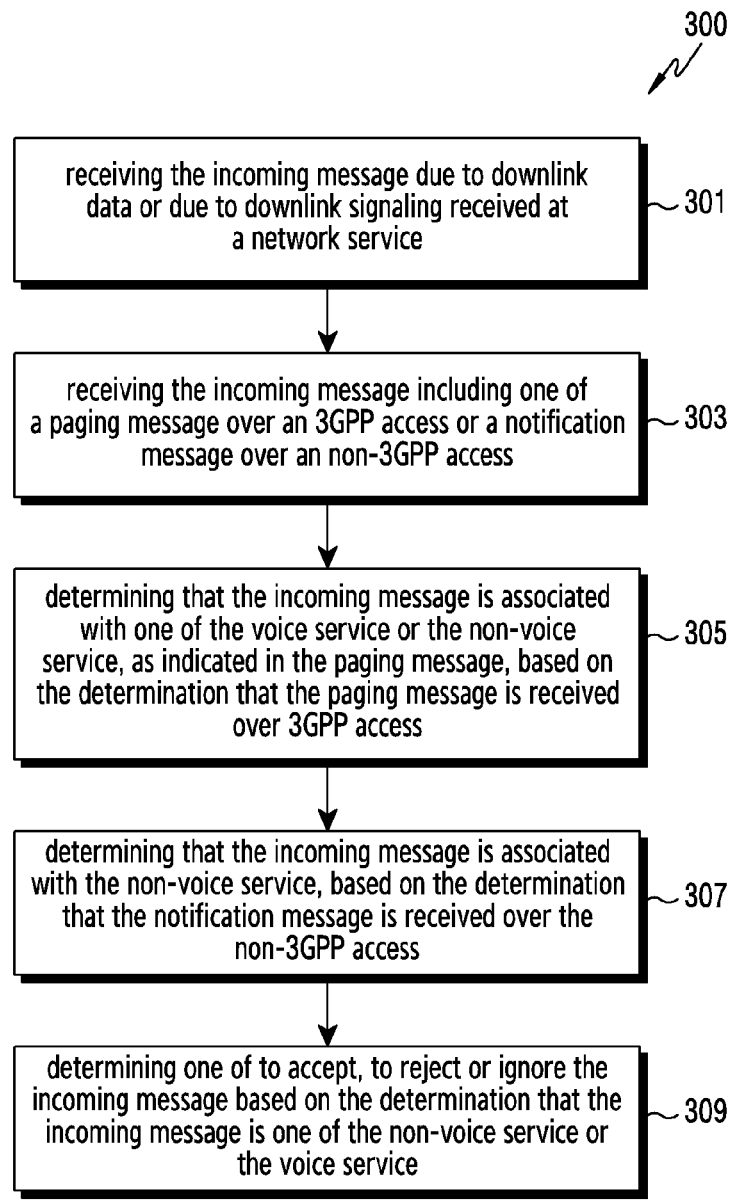
FIG. 3 illustrates a flow chart depicting detailed steps for managing an incoming message to a MUSIM UE at the UE according to an embodiment of the present disclosure.

FIG. 3 illustrates a flow chart depicting detailed steps for managing an incoming message to a MUSIM UE at the UE according to an embodiment of the present disclosure.

FIG. 3 shows a method 300 implemented in the MUSIM UE 101.

Initially at step 301, the UE 101, receives the incoming message due to downlink data or due to downlink signaling that was received at the network. At step 303, the UE 101 receives the incoming message. The incoming message may include any of the paging message over an 3GPP access or the notification message over a non-3GPP access. Then at step 305, the UE 101 determines whether the incoming message is associated with one of the voice service or the non-voice service, as indicated in the paging message, when the UE 101 determines that the paging message is received over 3GPP access. Thereafter, at step 307, the UE 101 determines if the incoming message is associated with the non-voice service. The aforesaid was determined if the notification message is received over the non-3GPP access. Then based on determination the that the incoming message is one of the non-voice service or the voice service, at step 309, the UE 101 determines whether to accept, to reject or ignore the incoming message.

Figure 4:
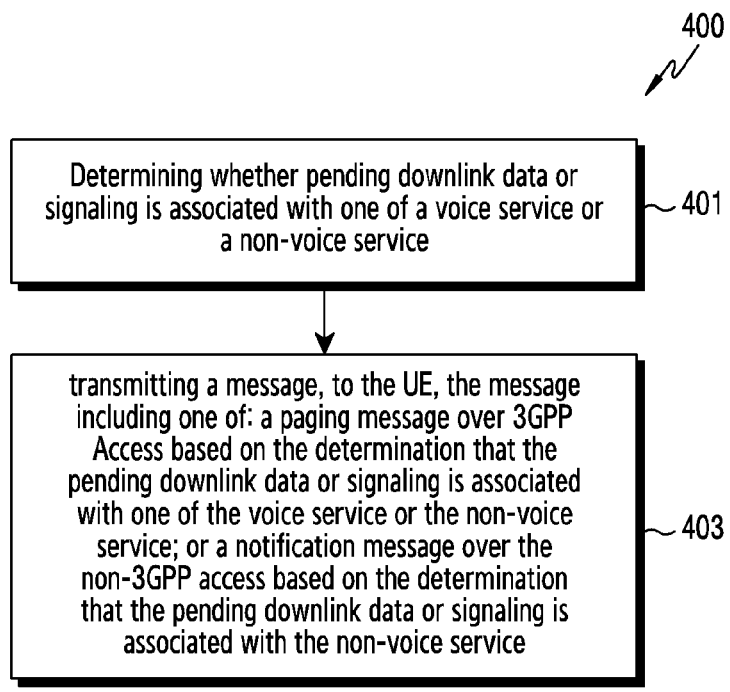
FIG. 4 illustrates a flow chart for managing an incoming message to a MUSIM UE at the network, according to an embodiment of the present disclosure.

FIG. 4 illustrates a flow chart for managing an incoming message to a MUSIM UE at the network according to an embodiment of the present disclosure. FIG. 4 shows a method 400 implemented in the MUSIM at the network.

Initially when any downlink data or signalling data is received or ant downlink data is pending at the network, then at the at step 401, the network determines whether pending downlink data or signaling is associated with one of a voice service or a non-voice service.

Based on the determination at the step 403, the network transmit a message, to the UE 101, the message including one of: a paging message over 3GPP Access based on the determination that the pending downlink data or signalling is associated with one of the voice service or the non-voice service, or a notification message over the non-3GPP access based on the determination that the pending downlink data or signalling is associated with the non-voice service.

According to an embodiment, when the UE 101 decides to accept the incoming service then, the UE 101 send a service request to the network. Accordingly, the network receives the service request message from the UE 101 over the 3GPP access to accept the non-voice service.

Further, according to further embodiment, when the UE 101 decides to reject the incoming service then, the UE 101 transmits a notification response message over the non-3GPP access network to the network. Accordingly, the network receives, based on the transmission of the notification message over the non-3GPP access network to the UE 101, a notification response message over a non-3GPP access to indicate inability of the UE to send service request over 3GPP access due to UE implementation constraints.

Further, according to yet further embodiment, the network prohibits to transmit the notification message over non-3GPP access when it was determined at the step 401 that the incoming message is associated with the voice service.

Accordingly, the network transmits the notification message, over the non-3GPP access network, that is transmitted to the UE 101 when the following condition is satisfied:
- the UE supports and requests for the paging cause indication feature to the network,
- the network has indicated "paging indication for voice services supported" to the UE, and
- the downlink data or signalling is related to non-voice service.

Figure 5:
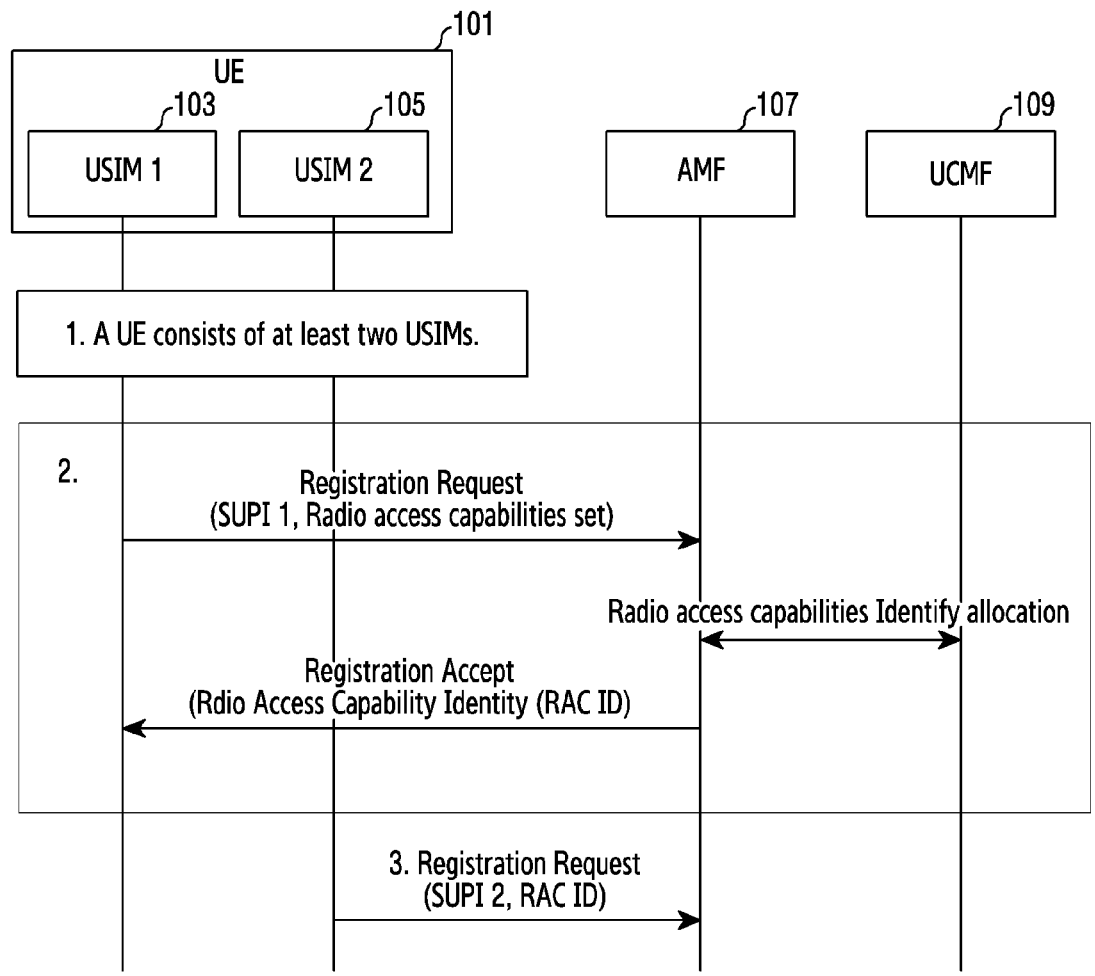
FIG. 5 illustrates a registration procedure for the USIM according to an embodiment of the present disclosure.

According to further embodiment, FIG. 5 illustrates a registration procedure for the USIM according to the embodiments as disclosed herein. According to the embodiments herein, a method and system is provided for setting up a network configuration of a multi-USIM or MUSIM. A UE 101 (also referred as a device) is a multi-USIM UE is a UE 101 with multiple USIMs capable of maintaining a separate registration state with a PLMN for each USIM at least over 3GPP Access. The UE 101 initiates registration procedure for the USIM-1 103 to the register with the PLMN of the USIM-1 103, the UE 101 uses the same set of radio capabilities as used for the USIM-1 103. The UE 101 may send the radio capability identification (RAC ID) as received in the registration request message or other NAS or AS message to the AMF 107 or NG-RAN respectively. In addition, the network determines that the UE 101 supports multi-USIM, then the network sends an information element indicating the UE 101 to use the same RAC ID for the set of radio capabilities if the UE 101 is using the same radio capabilities for other USIM. The network determines that the UE 101 supports multi-USIM if the UE 101 sends a capability indicating support of multi-USIM in a NAS message during the registration procedure or any other NAS procedure.

Figure 6:
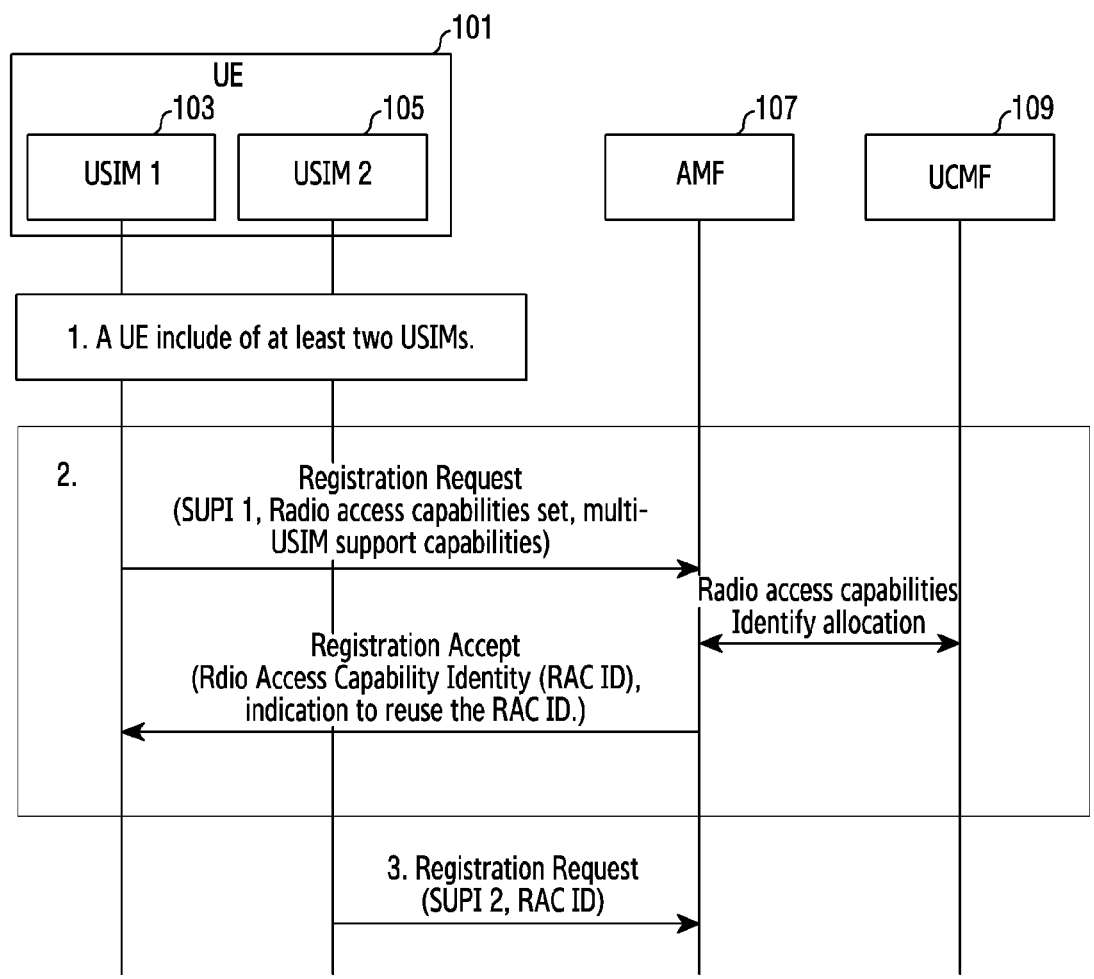
FIG. 6 illustrates a network determination of the device that supports multi-USIM according to an embodiment of the present disclosure.

Referring now to the drawings, and more particularly to FIG. 5 through FIG. 6, where similar reference characters denote corresponding features consistently throughout the figures, there are shown preferred embodiments. According to embodiment, the FIG. 6 illustrates a network determination of the device that supports multi-USIM according to the embodiments as disclosed herein. A dual USIM UE contains two USIMs and subscriptions of the USIMs are different and independent of each other. The device is registered to an operator for a first USIM or the USIM-1 and the operator sends the radio capability identity for a radio capabilities set, emergency number list or operator determined access class barring configuration to the UE for the first USIM.

Figure 7:
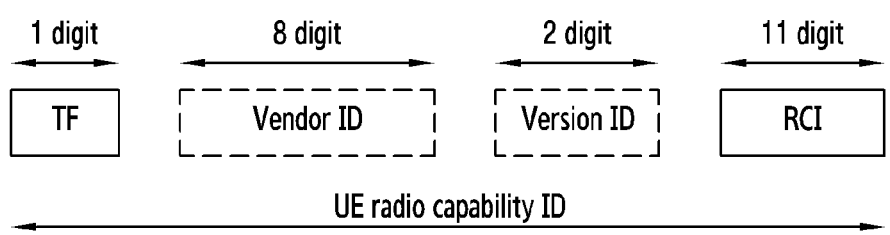
FIG. 7 illustrates structure of the UE radio capability ID according to an embodiment of the present disclosure.

FIG. 7 illustrates structure of the UE radio capability ID, according to the embodiments as disclosed herein. The UE radio capability ID (RAC ID) is an identifier used to represent a set of UE radio capabilities, defined in 3GPP TS 23.501 and in 3GPP TS 23.401. The UE 101 radio capability ID is composed of the following elements (each element may include hexadecimal digits only):

1) Type field (TF): identifies the type of UE radio capability ID. The following values are defined:
   0: manufacturer-assigned UE radio capability ID,
   1: network-assigned UE radio capability ID, and
   2 to F: spare values for future use;
2) The vendor ID is an identifier of UE manufacturer. This is defined by a value of private enterprise number issued by internet assigned numbers authority (IANA) in its capacity as the private enterprise number administrator. This field is present only if the Type Field is set to 0;
3) The version ID is the current version ID configured in the UCMF. This field is present only if the Type Field is set to 1. Its length is 2 hexadecimal digits; and
4) Radio configuration Identifier (RCI): identifies the UE radio configuration. Its length is 11 hexadecimal digits.

It is to be understood that the private enterprise number issued by IANA is a decimal number in the range between 0 and 4294967295 that needs to be converted to a fixed length 8-digit hexadecimal number when used within the UE radio capability ID. For example, 32473 is converted to 00007ED9.

FIG. 5 illustrates a registration procedure for the USIM, according to the embodiments as disclosed herein.

Referring to the FIG. 5 the method solution containing the following steps are to be considered:
1. A device includes two universal integrated circuit card (UICCs), UICC 1 containing USIM-1 103. The USIM-1 may also be referred as UE-1 without deviating from the scope of the disclosure. Another UICC 2 containing USIM-2 105. The USIM-1 may also be referred as UE-1 without deviating from the scope of the disclosure. In a multi-USIM device, each UICC is associated with a unique MEI;
2. The device is registered to a PLMN for the USIM-1 103. The PLMN assigns an RAC ID for a set of radio capabilities (also called as UE radio capabilities) sent to the AMF 107 of the PLMN during the registration procedure or any other NAS procedure i.e., the UE 101 receives the RAC ID;
3. In this aspect of the disclosure, the radio capabilities sent to the AMF 107 may be read as the radio capabilities either received from the UE 101 or RAN node (eNB or gNB or NG-eNB); and 4. The device initiates registration procedure (initial registration procedure or periodic registration procedure or mobility registration procedure) for the USIM-2 105 to the registered PLMN of the USIM-1 103, the UE 101 uses the same set of radio capabilities as used for the USIM-1 103. The UE 101 sends the RAC ID as received in the step-2 in the registration request message or other NAS or AS message to the AMF or NG-RAN respectively. The network nodes (AMF or NG-RAN) use the RAC ID (for e.g., to identify the set of radio capabilities) sent by the UE 101 in the subsequent NAS or AS procedure. Also performs UE radio capabilities resolution with the received RAC ID and uses those UE radio capabilities in RAN or core network procedures, store that UE radio capabilities in the UE context. This avoids the need to query the UE radio capability of the UE over the radio interface. If the device had received RAC ID for the set of the radio capabilities from the PLMN previously for the USIM 2 then the device may use previously assigned RAC ID and sends the RAC ID received in the step-2 for the set of radio capabilities for the USIM-2 105 in a NAS or AS message.

In one example, the above scenario applies for the case when the device does not have RAC ID received from the PLMN for the set of the radio capabilities for the USIM-2 105. If the device has previously received any RAC ID for the same set of radio capabilities for the USIM-2 105 then the device may keep using previously assigned RAC ID for the USIM-2 105.

In general, If UE-1 is assigned with a RAC ID against the UE radio capabilities then UE-2 can also use the same RAC ID against the same set of the UE radio capability in its procedures towards network. If RAC ID is PLMN assigned RAC ID, then that RAC ID may be used only in that PLMN. i.e., the RAC ID can be stored in the common storage between one or more of the UEs of a multi-USIM device.

FIG. 6 illustrates a network determination of the device that supports multi-USIM, according to the embodiments as disclosed herein.

Referring to the FIG. 6 the method solution containing the following steps are to be considered:
1. A device consists of two UICCs, UICC 1 containing USIM-1 103 and another UICC 2 containing USIM-2 105. In multi-USIM device, each UICC is associated with a unique IMEI. For the ease of understanding the reference numeral have been kept same wherever applicable throughout the disclosure;
2. The device is registered to a PLMN for the USIM-1 103. The PLMN assigns a RAC ID for a set of radio capabilities received from the UE 101 in a NAS message during the registration procedure or any other NAS procedure. The network sends the RAC ID in a NAS message during the registration procedure or other NAS procedure; and
3. In addition, the network determines that the device supports multi-USIM, then the network sends an information element indicating the UE 101 to use the same RAC ID for the set of radio capabilities if the UE is using the same radio capabilities for other USIM. The network determines that the device supports multi-USIM if the UE 101 sends a capability indicating support of multi-USIM in a NAS message during the registration procedure or any other NAS procedure.

In one example the UE 101 sends a type allocation code (TAC) of the IMEI of the corresponding a second USIM or the IMEI corresponding to the second USIM 105. In this case, the network determines that the device supports multi-USIM if the network received the TAC of the IMEI corresponding to the second USIM or IMEI corresponding to the second USIM. If network determines that the TAC of the first IMEI (corresponding to the first USIM) and the TAC of the second IMEI (corresponding to the second USIM) are same, then the network assign same RAC ID. The UE 101 initiates registration procedure for the second USIM to the PLMN and the UE 101 uses the same set of radio capabilities, the UE 101 includes the RAC ID received in step-2 if the information element (IE) indicates to use the same RAC ID for the set of radio capabilities for other USIM.

The above embodiments are also applicable for the case when the device consists of a single UICC and the UICC has multiple USIMs. For example, in this case for a subscription permanent identifier (SUPI), if the network assigns a RAC ID for the set of the radio capabilities the UE 101 uses the same RAC ID for the set of the radio capabilities for the second USIM of the UICC i.e., the UE 101 sends same the RAC ID in a NAS message (e.g., in the registration request message) when the UE 101 uses the set of radio capabilities.

The above embodiments are also applied for the case for local emergency number or extended local emergency number or operator-defined access category definitions. For example, the local emergency number or extended local emergency number or operator-defined access category definitions received from an PLMN for a USIM, is also used for the second USIM of the device. The above embodiments are applicable for the 5GS, EPS or UMTS or combination of any of these systems.

In one example, a solution can be the combination of any existing solutions defined above.

In general, if the UE has received the PLMN assigned RAC ID from the network-1 in the NAS message for a set of UE radio capabilities then the MUSIM UE can store the same in common storage between the USIM stacks. Whenever, UE 101 uses same set of UE radio capabilities and for the same PLMN then UE 101 can use the same RAC ID while interacting with network for one or more USIMs of the multi USIM device.

The embodiments disclosed herein can be implemented using at least one software program running on at least one hardware device and performing network management functions to control the elements.

Figure 8:
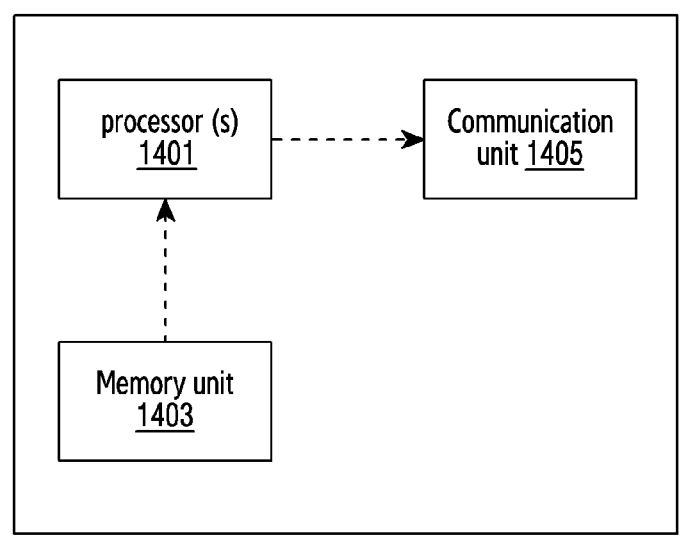
FIG. 8 illustrates exemplary diagram of a network node according to an embodiment of the present disclosure.

FIG. 8 illustrates exemplary diagram of a network node according to an embodiment of the present disclosure.

The network node 1400 may include a communication unit 1405 (e.g., communicator or communication interface), a memory unit 1403 (e.g., storage), and at least one processor 1401. Further, the network node 1400 may also include the cloud-RAN (C-RAN), a central unit (CU), a core network (NW), a distributed unit (DU) or the any other possible network (NW) entity (e.g., AMF, SMF).

In an example, the processor 1401 may be a single processing unit or a number of units, all of which could include multiple computing units. The processor 1401 may be implemented as one or more microprocessors, microcomputers, microcontrollers, digital signal processors, central processing units, state machines, logic circuitries, and/or any devices that manipulate signals based on operational instructions. Among other capabilities, the processor 1401 is configured to fetch and execute computer-readable instructions and data stored in the memory. The processor may include one or a plurality of processors. At this time, one or a plurality of processors may be a general purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU). The one or a plurality of processors control the processing of the input data in accordance with a predefined operating rule or artificial intelligence (AI) model stored in the non-volatile memory and the volatile memory. The predefined operating rule or artificial intelligence model is provided through training or learning.

The memory unit 1403 may include any non-transitory computer-readable medium known in the art including, for example, volatile memory, such as static random access memory (SRAM) and dynamic random access memory (DRAM), and/or non-volatile memory, such as read-only memory (ROM), erasable programmable ROM, flash memories, hard disks, optical disks, and magnetic tapes.

The communication unit 1405 The communication unit 1405 may perform functions for transmitting and receiving signals via a communication channel.

Figure 9:
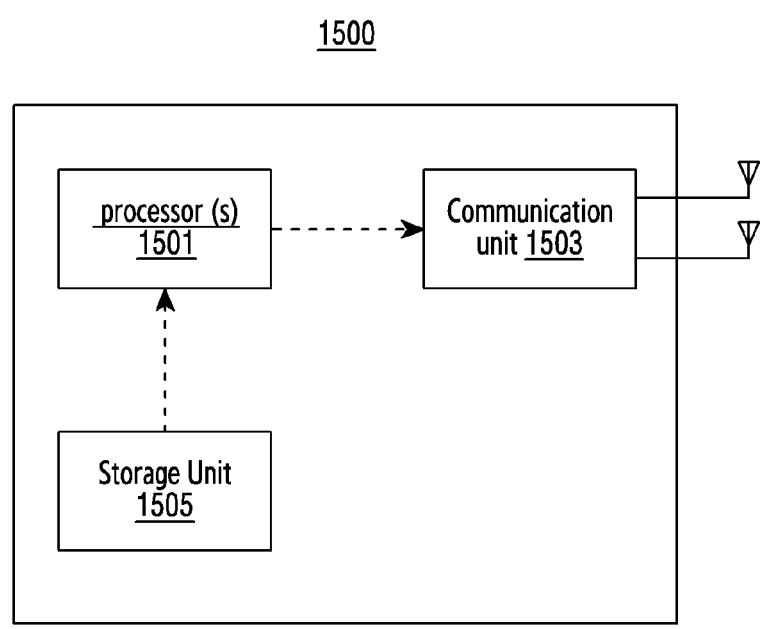
FIG. 9 is a diagram illustrating the configuration of a terminal in a wireless communication system/UE according to an embodiment of the present disclosure.

FIG. 9 is a diagram illustrating the configuration of a terminal 1500 in a wireless communication system/UE according to an embodiment of the present disclosure.

The configuration of FIG. 9 may be understood as a part of the configuration of the terminal/UE 1500. Hereinafter, it is understood that terms including "unit" or "module" at the end may refer to the unit for processing at least one function or operation and may be implemented in hardware, software, or a combination of hardware and software.

Referring to FIG. 9, the terminal/UE 1500 may include a communication unit 1503 (e.g., communicator or communication interface), a storage unit 1505 (e.g., storage), and at least one processor 1501. By way of example, the terminal/UE 1500 may be a User Equipment, such as a cellular phone or other device that communicates over a plurality of cellular networks (such as a 3G, 4G, a 5G or pre-5G, 6G network or any future wireless communication network).

The communication unit 1503 may perform functions for transmitting and receiving signals via a wireless channel.

The terminal/UE 1500 may further include memory unit. The memory unit may include any non-transitory computer-readable medium known in the art including, for example, volatile memory, such as static random access memory (SRAM) and dynamic random access memory (DRAM), and/or non-volatile memory, such as read-only memory (ROM), erasable programmable ROM, flash memories, hard disks, optical disks, and magnetic tapes.

In an embodiment, a method for managing an incoming message to a MUSIM UE registered with an AMF on a 3GPP access and a non-3GPP access of same network is provided. The method comprises: receiving an incoming message including one of a paging message over an 3GPP access or a notification message over an non-3GPP access, wherein the paging message is associated with a voice service or a non-service service and notification message is associated with non-voice service; and performing one of to accept, to reject or ignore the incoming message based on a determination that the incoming message is one of the voice service and non-voice service.

In an embodiment, the acceptance of the incoming message may include triggering a service request message over the 3GPP access to accept the non-voice service.

In an embodiment, the rejection of the incoming message may include transmitting a notification response message over a non-3GPP access to a network to indicate inability of the UE to send a service request message over 3GPP access due to the UE implementation constraints.

In an embodiment, the notification message over the non-3GPP access network may be received by the UE based on below condition: the UE supports and requests for a paging cause indication feature to the network, the network has indicated "paging indication for voice services supported" to the UE, and the downlink data or signalling is related to the non-voice service.

In an embodiment, a method at a network for managing to send the message to a MUSIM UE registered with an AMF on a 3GPP Access and a non-3GPP access of same network is provided. The method comprises: determining, by the network, whether pending downlink data or signaling is associated with one of a voice service or a non-voice service; and transmitting a message, to the UE, the message including one of: a paging message over 3GPP Access based on the determination that the pending downlink data or signaling is associated with one of the voice service or the non-voice service; or a notification message over the non-3GPP access based on the determination that the pending downlink data or signaling is associated with the non-voice service.

In an embodiment, the method further comprises: receiving a service request message from the UE over the 3GPP access to accept the non-voice service.

In an embodiment, the method further comprises: receiving, based on the transmission of the notification message over the non-3GPP access network to the UE, a notification response message over a non-3GPP access to indicate inability of the UE to send service request over 3GPP access due to UE implementation constraints.

In an embodiment, the notification message over the non-3GPP access network may be transmitted to the UE based on below condition: the UE supports and requests for the paging cause indication feature to the network, the network has indicated "paging indication for voice services supported" to the UE, and the downlink data or signalling is related to non-voice service.

In an embodiment, based on the determination that the incoming message is associated with the voice service, the network may prohibit to transmit the notification message over non-3GPP access.

In an embodiment, a method for managing an incoming message to a MUSIM UE registered with an AMF on a 3GPP access and a non-3GPP access of same network is provided. The method comprises: receiving the incoming message due to downlink data or due to downlink signaling received at a network; receiving the incoming message including one of a paging message over an 3GPP access or a notification message over an non-3GPP access; determining that the incoming message is associated with one of the voice service or the non-voice service, as indicated in the paging message, based on a determination that the paging message is received over 3GPP access; determining that the incoming message is associated with the non-voice service, based on the determination that the notification message is received over the non-3GPP access; and determining one of to accept, to reject or ignore the incoming message based on the determination that the incoming message is one of the non-voice service or the voice service.

In an embodiment, a MUSIM UE, for managing an incoming message, registered with an AMF on a 3GPP access and a non-3GPP access of same network is provided. The UE comprises one or more processors configured to: receive an incoming message including one of a paging message over an 3GPP access or a notification message over an non-3GPP access; wherein the paging message is associated with a voice service or a non-service service and notification message is associated with non-voice service; and perform one of to accept, to reject or ignore the incoming message based on the determination that the incoming message is one of the voice service and non-voice service.

In an embodiment, the acceptance of the incoming message may include triggering a service request message over the 3GPP access to accept the non-voice service.

In an embodiment, the rejection of the incoming message may include transmitting a notification response message over a non-3GPP access to a network to indicate inability of the UE to send a service request message over 3GPP access due to the UE implementation constraints.

In an embodiment, the notification message over the non-3GPP access network may be received by the UE based on below condition: the UE supports and requests for the paging cause indication feature to the network, the network has indicated "paging indication for voice services supported" to the UE, and the downlink data or signalling is related to non-voice service.

In an embodiment, a network node for managing to send the message to a MUSIM UE registered with an AMF on a 3GPP Access and a non-3GPP access of same network is provided. The network node comprising one or more processors configured to: determine whether pending downlink data or signaling is associated with one of a voice service or a non-voice service; and transmit a message, to the UE, the message including one of: a paging message over 3GPP Access based on the determination that the pending downlink data or signaling is associated with one of the voice service or the non-voice service, or a notification message over the non-3GPP access based on the determination that the pending downlink data or signaling is associated with the non-voice service.

In an embodiment, the one or more processors may be configured to: receive a service request message from the UE over the 3GPP access to accept the non-voice service.

In an embodiment, the one or more processors may be configured to: receive, based on the transmission of the notification message over the non-3GPP access network to the UE, a notification response message over a non-3GPP access to indicate inability of the UE to send service request over 3GPP access due to UE implementation constraints.

In an embodiment, the notification message over the non-3GPP access network may be transmitted to the UE based on below condition: the UE supports and requests for the paging cause indication feature to the network, the network has indicated "paging indication for voice services supported" to the UE, and the downlink data or signalling is related to non-voice service.

In an embodiment, based on the determination that the incoming message is associated with the voice service, the network may prohibit to transmit the notification message over non-3GPP access.

In an embodiment, a MUSIM UE, for managing an incoming message, registered with an AMF on a 3GPP access and a non-3GPP access of same network is provided. The UE comprising one or more processors configured to: receive the incoming message due to downlink data or due to downlink signaling at a network; receive the incoming message including one of a paging message over an 3GPP access or a notification message over an non-3GPP access; determine that the incoming message is associated with one of the voice service or the non-voice service, as indicated in the paging message, based on the determination that the paging message is received over 3GPP access; and determine that the incoming message is associated with the non-voice service, based on the determination that the notification message is received over the non-3GPP access; and determine one of to accept, to reject or ignore the incoming message based on the determination that the incoming message is one of the non-voice service or the voice service.

While specific language has been used to describe the disclosure, any limitations arising on account of the same are not intended. As would be apparent to a person in the art, various working modifications may be made to the method in order to implement the inventive concept as taught herein.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein.

Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component of any or all the claims.

The methods according to the embodiments of the disclosure described in the specification or the claims may be implemented by hardware, software, or a combination thereof.

When the methods are implemented by software, a computer-readable storage medium or a computer program product may be provided to store one or more programs (software modules). The one or more programs stored in the computer-readable storage medium or the computer program product may be configured for execution by one or more processors in an electronic device. The one or more programs may include instructions for causing the electronic device to execute the methods according to the embodiments of the disclosure described in the specification or the claims.

These programs (software modules or software) may be stored in random access memories (RAMs), non-volatile memories including flash memories, read only memories (ROMs), electrically erasable programmable ROMs (EE-PROMs), magnetic disc storage devices, compact disc-ROMs (CD-ROMs), digital versatile discs (DVDs), other types of optical storage devices, or magnetic cassettes. Alternatively, the programs may be stored in a memory configured by a combination of some or all of such storage devices. Also, each of the memories may be provided in plurality.

Also, the programs may be stored in an attachable storage device that may be accessed through a communication network such as Internet, Intranet, local area network (LAN), wide LAN (WLAN), or storage area network (SAN), or through a communication network configured by any combination thereof. Such a storage device may be connected through an external port to an apparatus performing an embodiment of the disclosure. Also, a separate storage device on a communication network may be connected to an apparatus performing an embodiment of the disclosure.

In the above particular embodiments of the disclosure, the components included in the disclosure are expressed in the singular or plural according to the presented particular embodiments of the disclosure. However, the singular or plural expressions are selected suitably according to the presented situations for convenience of description, the disclosure is not limited to the singular or plural components, and the components expressed in the plural may even be configured in the singular or the components expressed in the singular may even be configured in the plural.

While the disclosure has been shown and described with reference to various embodiments thereof, it will be understood by those skilled in the art that various changes in form and details may be made therein without departing from the spirit and scope of the disclosure as defined by the appended claims and their equivalents.

Although the present disclosure has been described with various embodiments, various changes and modifications may be suggested to one skilled in the art. It is intended that the present disclosure encompass such changes and modifications as fall within the scope of the appended claims.

What is claimed is:

1. A method for a user equipment (UE) including a multi-universal subscriber identity module (MUSIM) in a wireless communication system, the method comprising:
performing a registration operation to a public land mobile network (PLMN) on both of a $3^{rd}$ generation partnership project (3GPP) access network and a non-3GPP access network;
receiving, from an access and mobility management function (AMF), a notification message over the non-3GPP access network; and
transmitting, to the AMF, at least one of: a service request message over the 3GPP access network and a notification response message, over the non-3GPP access network, indicating inability of the UE to send the service request message.

2. The method of claim 1, further comprising:
receiving, from the AMF, a paging message over the 3GPP access network,
wherein the paging message is related to a voice service.

3. The method of claim 1, wherein the inability of the UE to send the service request message is due to a UE implementation constraint.

4. The method of claim 1, wherein
the notification message is received in case that:
the UE supports a paging cause indication,
the UE is indicated by the AMF that a paging indication for a voice service is supported, and
the AMF identifies that downlink data for the UE is related to a non-voice service.

5. The method of claim 1, wherein the notification message is received over the non-3GPP access network while the 3GPP access network is an idle state.

6. A method for an access and mobility management function (AMF) in a wireless communication system, the method comprising:
transmitting, to a user equipment (UE), a notification message over a non-3rd generation partnership project (3GPP) access network; and
receiving, from the UE, at least one of: a service request message over a 3GPP access network and a notification response message, over the non-3GPP access network, indicating inability of the UE to send the service request message,
wherein the UE is registered to a public land mobile network (PLMN) on both of the 3GPP access network and a non-3GPP access network.

7. The method of claim 6, further comprising:
transmitting, to the UE, a paging message over the 3GPP access network,
wherein the paging message is related to a voice service.

8. The method of claim 6, wherein the inability of the UE to send the service request message is due to a UE implementation constraint.

9. The method of claim 6, wherein the notification message is received in case that:
the UE supports a paging cause indication,
the UE is indicated by the AMF that a paging indication for a voice service is supported, and
the AMF identifies that downlink data for the UE is related to a non-voice service.

10. The method of claim 6, wherein the notification message is transmitted over the non-3GPP access network while the 3GPP access network is an idle state.

11. A user equipment (UE) including a multi-universal subscriber identity module (MUSIM) in a wireless communication system, the UE comprising:
a communication circuit; and
at least one processor coupled to the communication circuit, the at least one processor configured to:
perform a registration operation to a plublic land mobile network (PLMN) on both of a $3^{rd}$ generation partnership project (3GPP) access network and a non-3GPP access network,
receive, from an access and mobility management function (AMF), a notification message over the non-3GPP access network; and
transmit, to the AMF, at least one of: a service request message over the 3GPP access network and a notification response message, over the non-3GPP access network, indicating inability of the UE to send the service request message.

12. The UE of claim 11, wherein the at least one processor is further configured to:
receive, from the AMF, a paging message over the 3GPP access network, and
wherein the paging message is related to a voice service.

13. The UE of claim 11, wherein the inability of the UE to send the service request message is due to a UE implementation constraint.

14. The UE of claim 11, wherein the notification message is received over the non-3GPP access network while the 3GPP access network is an idle state.

15. The UE of claim 11, wherein the notification message is received in case that:
the UE supports a paging cause indication,
the UE is indicated by the AMF that a paging indication for a voice service is supported, and
the AMF identifies that downlink data for the UE is related to a non-voice service.

16. An access and mobility management function (AMF) in a wireless communication system, the AMF comprising:
a communication circuit; and
at least one processor coupled to the communication circuit, the at least one processor configured to:
transmit, to a user equipment (UE), a notification message over a non-$3^{rd}$ generation partnership project (3GPP) access network, and receive, from the UE, at least one of: a service request message over a 3GPP access network and a notification response message, over the non-3GPP access network, indicating inability of the UE to send a service request message, wherein the UE is registered to a public land mobile network (PLMN) on both of the 3GPP access network and a non-3GPP access network.

17. The AMF of claim 16,
wherein the at least one processor is further configured to:
transmit, to the UE, a paging message over the 3GPP access network, and
wherein the paging message is related to a voice service.

18. The AMF of claim 16, wherein the inability of the UE to send the service request message is due to UE implementation constraint.

19. The AMF of claim 16, wherein:
the notification message is received in case that:
the UE supports a paging cause indication,
the UE is indicated by the AMF that a paging indication for a voice service is supported, and
the AMF identifies that downlink data for the UE is related to a non-voice service.

20. The AMF of claim 16, wherein the notification message is received over the non-3GPP access network while the 3GPP access network is an idle state.

* * * * *